United States Patent [19]

Dao

[11] 3,710,276

[45] Jan. 9, 1973

[54] DIGITAL VARIABLE QUADRATURE SINE WAVE VOLTAGE CONTROLLED OSCILLATOR

[75] Inventor: Tich T. Dao, Cupertino, Calif. 94400

[73] Assignee: Ampex Corp., Redwood City, Calif.

[22] Filed: June 1, 1971

[21] Appl. No.: 148,345

[52] U.S. Cl. ....................331/45, 307/261, 307/262, 328/27, 328/62, 331/60, 331/77

[51] Int. Cl. ........................H03b 19/14, H03b 27/00

[58] Field of Search ........331/45, 60, 74, 77; 328/27, 328/37, 62; 307/221, 261, 262

[56] References Cited

UNITED STATES PATENTS 3,529,260 9/1970 Noyes, Jr. ..........................331/77 X

*Primary Examiner*—Roy Lake
*Assistant Examiner*—Siegfried H. Grimm
*Attorney*—Robert G. Clay

[57] ABSTRACT

A pulse voltage controlled oscillator running at four times the desired frequency $f$ triggers a two stage shift register which has an inverted feedback loop. The outputs of both stages are similar square waves of frequency $f$, and they are set at a 90° phase difference of each other. Since a square wave of frequency $f$ possesses only harmonics of odd orders, a low pass filter which rejects $3f$ can admit a square wave frequency varying between $f$ and $3f$. A pair of identical filters coupled to the outputs of respective shift register stages provide output signals of corresponding frequency which are 90° out of phase. For a frequency range extending between $3f$ and $9f$, another pair of filters are required, etc. Additional shift registers may be added to the two stage shift register to provide output signals with a phase shift equal to the corresponding fraction of 360°.

5 Claims, 2 Drawing Figures

PATENTED JAN 9 1973 3,710,276

INVENTOR.
TICH T. DAO

BY Robert G. Clay

ATTORNEY

DIGITAL VARIABLE QUADRATURE SINE WAVE VOLTAGE CONTROLLED OSCILLATOR

BACKGROUND OF THE INVENTION

1. Field

The present invention relates to voltage controlled oscillators and particularly to a digital circuit for generating at least a pair of waveforms of constant amplitude, with selected phase differences, where frequency may vary within a selected range.

2. Prior Art

Various analog circuits are available for generating sine and cosine waves. Such circuits are comparatively complicated and cumbersome in function. Typical of prior art circuits, a voltage controlled oscillator provides a sine wave at fixed frequency. To obtain the cosine wave, the sine wave is fed to an integration network which provides the output $\cos\Omega t/\Omega$. This output in turn is fed to a multiplier, along with a second input $\Omega$, whereby the resulting product is equal to $\cos\Omega t$. Thus a cosine and sine wave, 90° out of phase, are generated. However, the analog voltage controlled oscillator, integrator and multiplier are relatively complicated circuits. The integrator is frequency dependent and accordingly, the multiplier is required to provide an $\Omega$ input in order to keep the output amplitude constant.

In order analog systems a variable sine wave oscillator drives a wide band, fixed phase-delay network which also is an elaborate circuit with a narrow frequency range of operation.

SUMMARY OF THE INVENTION

The present invention provides a relatively simple digital circuit for generating wide range, variable frequency, variable quadrature sine wave. To this end, a wide range, variable frequency, pulse generator provides pulses at four times the desired frequency $f$, which pulses are introduced to a multiple stage, shift register having an inverted feedback loop. The resulting pair of square waves are delayed from each other by one-fourth of the period, and are introduced to a pair of identical low pass filters which reject three times the selected frequency $f$ and thus admit a square wave frequency varying between $f$ and $3f$. Accordingly, the respective filters output a sine wave and a cosine wave, respectively, of corresponding frequency.

By way of the invention, given a low pass filter with cut off frequency of $3f$, a square wave of frequency $f$ passing through the filter generates a sine wave of constant amplitude, where frequency can vary within the range of $f$ to $3f$ without causing an amplitude variation. Two identical filters driven by the above square waves generate sine waves of the same frequency and same amplitude, which are 90° out of phase with each other (when utilizing a two-stage shift register).

Additional shift registers may be employed to provide a phase difference of other chosen fractions of 360°; e.g., three phase shifters provide 60° phase shift between waveforms, etc.

DESCRIPTION OF THE PREFERRED EMBODIMENTS

Figures 1, 2:
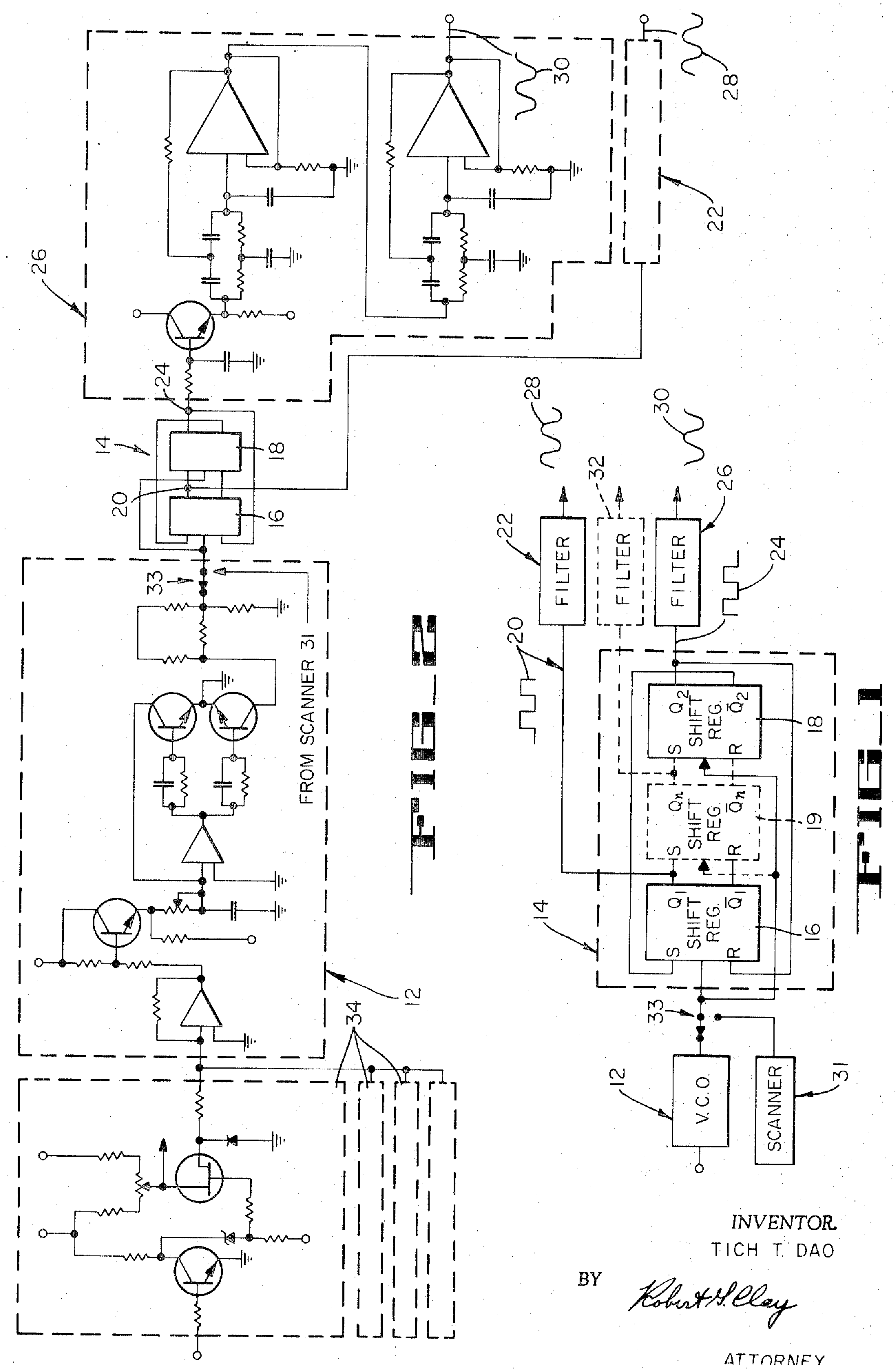
FIG. 1 is a block diagram illustrating the combination of the invention.
FIG. 2 is a schematic diagram illustrating in detail an implementation of the combination of FIG. 1.

Referring to FIGS. 1 and 2 a pulse voltage controlled oscillator means 12 provides clock pulses of selected frequency to a multiple stage (viz., two-stage) shift register means 14, defined by shift registers 16 and 18. The clock pulses have a frequency equal to four times a selected square wave frequency $f$, discussed infra. The shift registers 16, 18 are coupled with inverted feedback, i.e., the outputs of (last stage) shift register 18 are coupled to the opposite inputs of the (first stage) shift register 16 as is conventional in the art. Thus, the shift register means 14 provides a pair of square wave outputs of frequency $f$ and selected phase shift. One square wave from the shift register 16, illustrated here as numeral 20, is introduced to a first filter means 22, and a similar square wave 24 with 90° phase shift is introduced from the shift register 18 to a second filter means 26. The filter means 22, 26 are low pass filters with a cutoff frequency below $3f$ which, accordingly, can admit a square wave frequency which varies between $f$ and $3f$. Filter means 22 thus generates a sine wave 28 of constant amplitude and of a frequency corresponding to the frequency ($f$) introduced thereto, while the filter means 26 generates a cosine wave 30 of similar frequency ($f$) and constant amplitude.

Note that the incoming pulses at frequency $4f$ may be supplied via switch means 33 by scanner apparatus 31 such as a tachometer device in a speed servo system. Thus it may be seen that the invention combination contemplates the use of an inverted feedback configuration in a two stage shift register, to provide square wave signals which are 90° apart and of constant amplitude. The signals are fed to identical low pass filters to provide isolation of the fundamental frequency signals.

For a frequency range which extends between, for example, $3f$ and $9f$, a pair of filters of bandwidth from $3f$ to $9f$, are employed in place of filters 22, 26 of FIG. 1. Accordingly, variations in the frequency range extending between $3f$ and $9f$ are compensated in the latter embodiment. Active filter means 22, 26 of the design shown in FIG. 2 are generally conventional in design, and are shown and described in for example "Analysis and Synthesis of Linear Active Networks," S.K. Mitra, John Wiley and Sons Inc., New York, 1969. Example circuits are shown in FIG. 2, but are not specifically described herein.

As contemplated by the invention combination, the various phase-shifted square wave outputs are taken from the same output of each successive shift register (16, 18 . . . 19), e.g., in this instance, from the $Q_1, Q_2 \ldots Q_n$ outputs, respectively. The invention is shown herein as employing a two-stage shift register means 14 with sine and cosine outputs 90° apart in phase. However, as shown in phantom line, one or more phase shifters 19 may be inserted between shifters 16, 18, whereby the phase shift between the output waveforms are varied accordingly. For example, a three-stage shift register means would require three identical filter means (including additional filter means 32), and would provide three outputs with 60° phase differences.

FIG. 2 shows specific circuits which may be used to implement the combination of the invention seen in FIG. 1. The circuits of FIG. 2 are by way of illustration only, since various other circuits may be utilized to implement the combination. More particularly, the voltage controlled oscillator means 12 is of conventional design and provides a pulse output of selected frequency equal to four times the desired frequency *f*. As previously mentioned, the pulse input to the shift register means 14 may be provided for example, by, the scanner means 31 such as the tachometer wheel of a servo system. Since the voltage controlled oscillator means 12 and the scanner means 31 are conventional in design, the various components of the oscillator means 12 in FIG. 2 are shown but not discussed in detail herein.

The voltage controlled oscillator means 12, is shown herein coupled to an analog multiplier 34 which provides means (in combination with oscillator means 12) to introduce different, selected frequencies to the shift register means 14, in accordance with the invention.

The (two-stage) shift register means 14 with inverted feedback (FIG. 2) is also generally conventional in design, and may be found for example in *An Introduction to Counting Techniques and Transistor Circuit Logic*, K. J. Dean Reinhold Publication Corporation, 1964, page 149. Accordingly the shift register means 14 is not further described herein.

I claim:

1. A digital variable quadrature sine wave generator comprising;

a source of pulses;

shift register means coupled to the source of pulses and including inverted feedback means to generate at least a pair of square waves having a selected constant phase difference and identical frequencies;

filter means of selected frequency bandpass coupled to the shift register means to generate a pair of sine waves having equal and constant amplitudes and identical frequencies, said frequency being equal to the square wave frequency.

2. The sine wave generator of claim 1 wherein the source of pulses has a frequency $4f$; the shift register means generates the pair of square waves at a frequency $f$ at the selected phase difference; and the filter means includes a pair of identical filters of bandpass frequency equal to from $f$ to $3f$.

3. The sine wave generator of claim 2 wherein the shift register means includes at least two stages of shift registers each having "set" and "reset" inputs and "Q" and "$\bar{Q}$" outputs; wherein the first stage register "Q" and "$\bar{Q}$" are operatively coupled to the last stage register "set" and "reset" inputs respectively; the last stage register outputs "Q" and "$\bar{Q}$" are inverted and operatively coupled to the "reset" and "set" inputs of the first stage register respectively; and said square waves are taken from the "Q" outputs of the shift registers respectively.

4. The sine wave generator of claim 3 further including an additional shift register directly coupled between said two stages of shift registers to provide an additional square wave output of equal amplitude and frequency, wherein the phase difference between the square waves is constant and equal to 180° divided by the number of stages; and a third identical filter of frequency range between $f$ and $3f$ coupled to the additional shift register, said three filters defining equal and constant amplitude sine waves of equal frequencies having said phase difference.

5. The sine wave generator of claim 3 wherein the filter means includes a pair of filters of bandpass frequency equal to from $3f$ to $9f$.

* * * * *